US011550071B2

(12) United States Patent
Prevel et al.

(10) Patent No.: US 11,550,071 B2
(45) Date of Patent: Jan. 10, 2023

(54) MEASURING DEVICE INTENDED TO BE IMMERSED

(71) Applicant: THALES, Courbevoie (FR)

(72) Inventors: Florian Prevel, Brest (FR); Alain Galet, Brest (FR)

(73) Assignee: THALES, Courbevoie (FR)

( * ) Notice: Subject to any disclaimer, the term of this patent is extended or adjusted under 35 U.S.C. 154(b) by 267 days.

(21) Appl. No.: 16/755,878

(22) PCT Filed: Dec. 28, 2018

(86) PCT No.: PCT/EP2018/097068
§ 371 (c)(1),
(2) Date: Apr. 13, 2020

(87) PCT Pub. No.: WO2019/129839
PCT Pub. Date: Jul. 4, 2019

(65) Prior Publication Data
US 2021/0190981 A1 Jun. 24, 2021

(30) Foreign Application Priority Data

Dec. 28, 2017 (FR) ...................................... 1701399

(51) Int. Cl.
*G01V 1/18* (2006.01)
*G01V 1/38* (2006.01)
(52) U.S. Cl.
CPC ................ *G01V 1/186* (2013.01); *G01V 1/38* (2013.01)

(58) Field of Classification Search
CPC ........ G01V 1/186; G01V 1/38; G01V 1/3843; B63B 22/003; G10K 11/008
(Continued)

(56) References Cited

U.S. PATENT DOCUMENTS 3,141,148 A * 7/1964 Hueter ................. G10K 11/008
367/173
3,736,557 A * 5/1973 Brynk ..................... G01S 3/802
367/129

(Continued)

FOREIGN PATENT DOCUMENTS

GB 2 266 148 A 10/1993
GB 2 414 800 A 12/2005
(Continued)

*Primary Examiner* — Christopher P McAndrew
(74) *Attorney, Agent, or Firm* — BakerHostetler

(57) ABSTRACT

A measurement device intended to be immersed in water, includes a set of arms and a reference axis, the measurement device being able to be in a deployed configuration, the measurement device comprising a set of measurement units borne by arms of the set of arms and each comprising an acoustic-waves sensor, the set of measurement units being configured and arranged in such a way as to generate a torque on the measurement device about the reference axis upon a vertical translational movement of the measurement device in the deployed configuration, the measurement device comprising compensation means configured and arranged in such a way as to generate another torque on the measurement device about the reference axis during the vertical translational movement, the other torque being directed in the opposite direction to the torque and having an intensity less than twice that of the torque.

22 Claims, 10 Drawing Sheets

(58) Field of Classification Search
USPC .......................................................... 73/584
See application file for complete search history.

(56) References Cited

U.S. PATENT DOCUMENTS

| | | | | |
|---|---|---|---|---|
| 3,800,271 | A | * | 3/1974 | Stillman, Jr. ........ G10K 11/008 367/4 |
| 3,886,491 | A | * | 5/1975 | Jonkey ................. G10K 11/008 367/173 |
| 4,007,436 | A | * | 2/1977 | McMahon ........... G10K 11/006 367/173 |

FOREIGN PATENT DOCUMENTS

| | | | | |
|---|---|---|---|---|
| GB | 2414800 A | * | 12/2005 | ............ G01S 3/808 |
| WO | 2010/025494 A1 | | 3/2010 | |
| WO | WO-2010025494 A1 | * | 3/2010 | ............ B63B 22/00 |
| WO | 2011/014071 A2 | | 2/2011 | |

* cited by examiner

MEASURING DEVICE INTENDED TO BE IMMERSED

CROSS-REFERENCE TO RELATED APPLICATIONS

This application is a National Stage of International patent application PCT/EP2018/097068, filed on Dec. 28, 2018, which claims priority to foreign French patent application No. FR 17/01399, filed on Dec. 28, 2017, the disclosures of which are incorporated by reference in their entirety.

FIELD OF THE INVENTION

The field of the invention is that of measurement devices intended to be immersed. The measurement device comprises a reference axis and is able, when immersed, to be in a deployed configuration in which arms are distributed about the reference axis and bear a set of measurement units each comprising at least one acoustic sensor, and in which the reference axis extends substantially vertically. The measurement units generate a torque on the measurement device about the reference axis during a vertical translational movement of the measurement device in the deployed configuration.

BACKGROUND

The invention relates in particular to air-launchable acoustic buoys (sonobuoys) of the type described in patent application WO2010025494. The measurement device in air-launchable buoys is a receive antenna receiving acoustic signals and comprising a network of acoustic sensors. The measurement device is able to be in a stowed configuration in which it is housed in a tubular casing until the buoy becomes immersed. The arms then extend parallel to the axis r. The arms are released and deployed when the buoy is immersed. A perspective view of one example of a measurement device 500 of a sonobuoy of the type comprising arms 502 bearing acoustic sensors 501 and a reference axis r extending substantially vertically along the longitudinal axis of a dunking line 503 is depicted in FIG. 1. The sensors 501 each take the form of a plate that is inclined with respect to the axis r because of the need to house the arms 502 and the sensors 501 in a cylindrical tubular casing 504 of axis r prior to immersion, as depicted in FIG. 2. The arms 502 are inscribed inside the interior cylinder delimited by the casing 504 and in an annulus centered on the axis r and occupied by the arms 502.

Now, because of their inclination, the acoustic sensors generate a torque on the measurement device 500 about the axis r of the, substantially vertical, dunking line, when the measurement device 500 effects a translational movement along a vertical axis. The direction of the rotation brought about by a vertical translational movement of the measurement device 500 in the upward direction is indicated by an arrow in FIG. 1.

This rotation of the measurement device has the effect of impairing its performance. On the one hand, the flow of water over the acoustic sensors disrupts their hydroacoustic performance. On the other hand, the rotational movement of the acoustic sensors makes it difficult to determine their positions about the axis of the dunking line with precision and this has an unfavorable impact on the precision of the measurements of the receive antenna, and notably on the precision of the position of targets detected in a terrestrial frame of reference.

One solution for improving the positional accuracy is to equip the buoy with a compass capable of providing sufficiently accurate positioning data even in the presence of the rotation brought about by the arrangement of the sensors. However, that increases the cost of the compass at least tenfold. Furthermore, that solution does not improve the hydroacoustic performance of the hydrophones which are still subjected to the flow of the water, thereby limiting the performance of the buoy.

An alternative solution is to equip the buoy with a tarpaulin that deploys between the sensors as the arms deploy. This tarpaulin, which increases the vertical drag of the measurement device, has the purpose of limiting the vertical movements of the sensors. The drag of the tarpaulin greatly limits vertical movements. However, it may be desirable to change the depth of the hydrophones at a sufficient speed notably in order to take measurements at various depths. Furthermore, this solution is truly effective only with lightweight antennas and is bulky and expensive.

The uncontrolled vertical movements of the measurement device are chiefly caused by the swell, namely by a vertical movement of a body exhibiting positive buoyancy (referred to hereinafter as a buoyant body) positioned above the measurement device and connected to that device by the dunking line. The movements of the buoyant body as a result of the swell are transmitted to the measurement device via the dunking line. One solution is to limit the vertical movements of the measurement device by making part of the dunking line between the buoyant body and the measurement device in the form of a damping spring which dissociates the vertical movements of the buoyant body from those of the measurement device. The movements due to the swell have an amplitude of the order of 5 meters on either side of an equilibrium position. Now, when the weight of the immersed part of the buoy is great, it may prove complicated, if not to say impossible, to find a spring capable of exhibiting variations of elongation of 5 m on each side of an equilibrium position in order to afford this dissociation, while at the same time exhibiting drag greater than the weight of the immersed part of the buoy. In other words, in order for that solution to be effective, the forces associated with the movement of the swell need to be greater than the forces present in the damping spring under static conditions. As a consequence, in order for that solution to work, the buoy needs to be lightweight and exhibit significant drag. Furthermore, choosing that solution entails replacing a long length of cable of the dunking line with a damping spring which is expensive and bulky.

SUMMARY OF THE INVENTION

It is an object of the present invention to limit at least one of the aforementioned disadvantages.

To that end, the invention relates to a measurement device intended to be immersed in water, comprising a set of arms and a reference axis, the measurement device being able to be in a deployed configuration, the measurement device comprising a set of measurement units borne by arms of the set of arms and each comprising an acoustic-waves sensor, the set of measurement units being configured and arranged in such a way as to generate a torque on the measurement device about the reference axis upon a vertical translational movement of the measurement device in the deployed configuration, the measurement device comprising compensation means configured and arranged in such a way as to generate another torque on the measurement device about the reference axis during the vertical translational movement, the other torque being directed in the opposite direction to the torque and having an intensity less than twice that of the torque.

Advantageously, the arms extend radially about the reference axis.

Advantageously, each measurement unit of the measurement set comprises a first water-contact surface intended to be in direct physical contact with the water and oriented, in the deployed configuration, in such a way that it experiences, under the effect of the flow of water over the first water-contact surface during the vertical translational movement, a first force comprising a vertical component and a horizontal component comprising a tangential component generating an individual torque on the measurement device about the reference axis, the individual torques generated by the measurement units of the measurement set being oriented in the direction of the torque.

Advantageously, the compensation means comprise a set of at least one compensation unit comprising a second water-contact surface intended to be in direct physical contact with the water and oriented, in the deployed configuration, in such a way that it experiences, under the effect of the flow of water over the second water-contact surface during the vertical translational movement, a second force comprising a vertical component and a horizontal component comprising a tangential component generating an individual compensation torque on the measurement device about the reference axis, the individual compensation torque being oriented in the opposite direction to the torque.

Advantageously, the device according to the invention comprises at least one of the features hereinbelow considered alone or in combination:
- the other torque has an intensity substantially equal to the intensity of the torque,
- the compensation means comprise a set of at least one compensation unit intended to be in direct physical contact with the water and experiencing, under the effect of the flow of water over its surface during the vertical translational movement, a force that has a component tangential to the reference axis so as to generate another individual torque on the measurement device about the reference axis in the opposite direction to the torque,
- the compensation unit is arranged and configured in such a way that the force experienced by the compensation unit has a horizontal component comprising only a tangential component,
- the set of at least one compensation unit extends between two adjacent arms,
- at least one compensation unit is borne by an arm,
- each compensation unit is configured and arranged in such a way as to generate, during the vertical translational movement, an individual torque on the measurement device about the reference axis in the opposite direction to the torque,
- the set of at least one compensation unit and the set of measurement units is fixed to the set of arms,
- one compensation unit is associated with each measurement unit, the compensation unit associated with a measurement unit being fixed to the one same arm as the measurement unit and being configured and arranged in such a way as to generate, during the vertical translational movement, an individual torque on the measurement device substantially in the opposite direction to an individual torque generated by the measurement unit during this same vertical translational movement,
- the individual torque generated by the compensation unit is substantially the opposite of the individual torque generated by the measurement unit,
- the arms are telescopic and each comprise several segments able to slide relative to one another, the compensation unit being fixed to the one same segment as the associated measurement unit,
- the measurement unit is one piece with the associated compensation unit,
- the compensation unit occupies, about the reference axis r, an angular sector subtending a smaller angle than an angular sector occupied by the measurement device with which it is associated,
- the set of measurement units comprises a subset of measurement units which are mounted on the one same arm, the measurement units of the subset being positioned on the one same side of the plane radial to the reference axis passing through the axis of the arm,
- each compensation unit mounted on the arm is positioned on the other side of the radial plane,
- the second water-contact surface has a mean normal that is inclined, in the deployed configuration, with respect to the reference axis and with respect to a tangential axis, defined with respect to the reference axis, so as to generate the individual compensation torque on the measurement device about the reference axis,
- the second water-contact surface is oriented in the direction of the vertical translational movement,
- the compensation unit has the form of an essentially parallelepipedal plate,
- a straight line passing through a leading edge and a trailing edge of the compensation unit has a normal that is inclined, in the deployed configuration, with respect with respect to the reference axis and with respect to a second tangential axis, defined with respect to the reference axis, so as to generate the individual torque on the measurement device about the reference axis,
- the first water-contact surface has a mean normal that is inclined with respect to the reference axis and with respect to a tangential axis, defined with respect to the reference axis, so as to generate the individual torque on the measurement device about the reference axis,
- at least one compensation unit incorporates a measurement element other than an acoustic sensor,
- at least one compensation unit has no measurement element other than an acoustic sensor,
- the measurement device is able to be in a stowed configuration in which the arms are inscribed inside a cylinder the axis of which is the reference axis, the measurement units and the compensation means being configured and arranged in such a way as to be housed inside said cylinder when the measurement device is in the stowed configuration,
- the arms extend in a plane substantially perpendicular to the reference axis in the deployed configuration.

The invention also relates to a buoy comprising a measurement device according to the invention.

Advantageously, the sonobuoy comprises a buoyant body and a dunking line to which the buoyant body and the arm are connected, the buoy being configured in such a way that the buoyant body floats on the water surface and the dunking line extends longitudinally along a vertical axis that substantially coincides with the reference axis when the measurement device is in the deployed configuration.

BRIEF DESCRIPTION OF THE DRAWINGS

The invention will be better understood from studying a number of embodiments given by way of entirely nonlimiting examples and illustrated by attached drawings in which.

From one figure to another, the same elements are denoted by the same numerical references.

DETAILED DESCRIPTION

Figure 1:
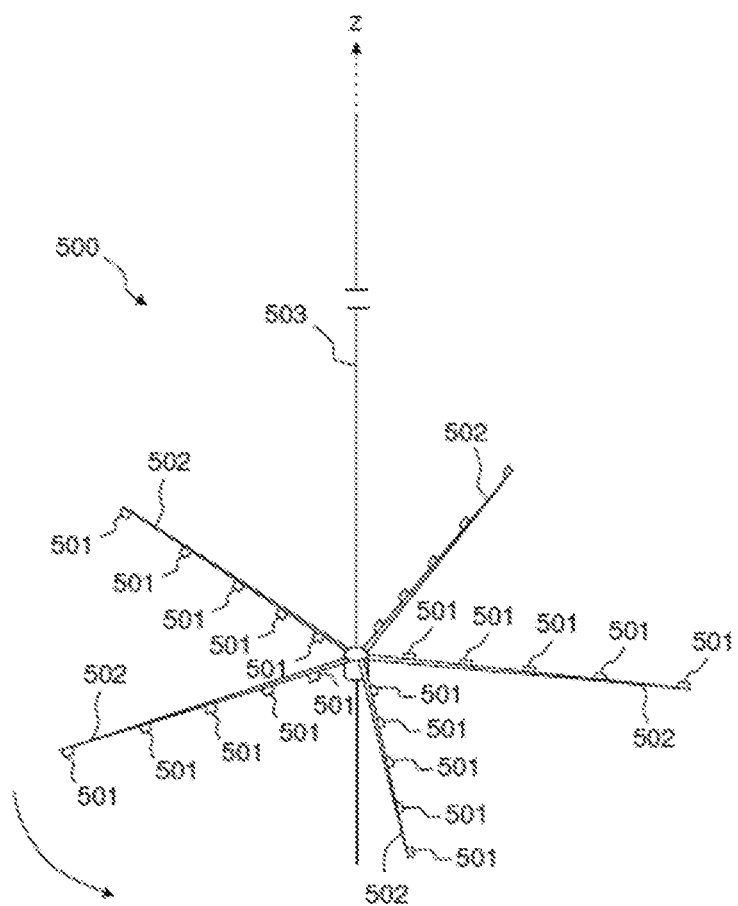
FIG. 1, already described, is a schematic perspective depiction of a deployed receive antenna of the prior art, FIG. 2, already described, is a schematic depiction of a transverse cross section through a buoy of the prior art stowed inside a cylindrical casing prior to immersion.
Figure 2:
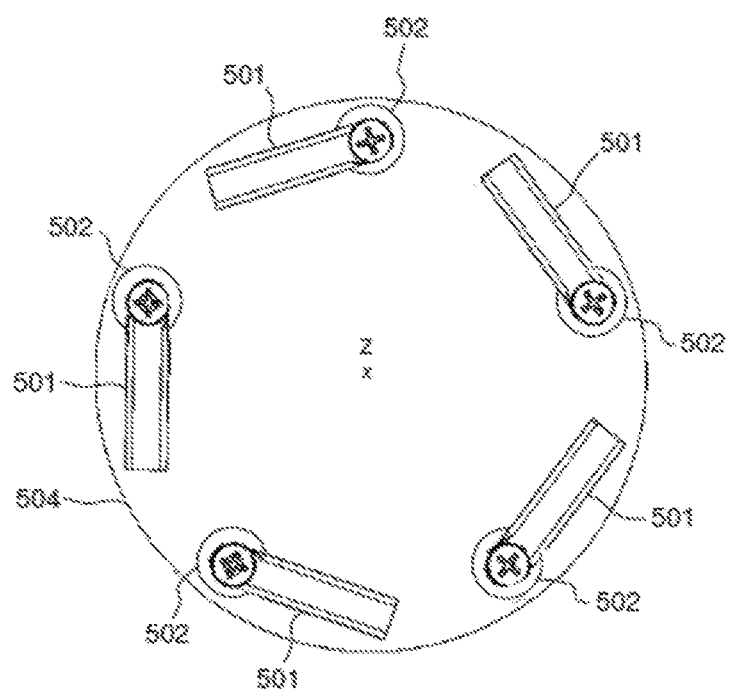

The invention applies to the measurement devices intended to be immersed and that comprise measurement units comprising acoustic sensors and which are borne by arms angularly distributed about a reference axis of the measurement device. The measurement device is able to be in a deployed configuration in which a reference axis of the measurement device is substantially vertical and in which the measurement units generate a torque on the measurement device about the reference axis during a vertical translational movement of the measurement device in the deployed configuration.

The deployed configuration is substantially stable in as much as the orientation of the arms with respect to the reference axis is substantially stable.

The reference axis may be the longitudinal axis along which a physical dunking line, connected to the arms, extends when the measurement device is in the deployed configuration and/or to a support body on which the arms are mounted.

Each measurement unit comprises at least one acoustic-waves sensor able to (or configured in order to) measure acoustic waves, for example a hydrophone or an electroacoustic transducer.

Each measurement unit may comprise at least one other means in an acoustic-wave measurement sequence, such as, for example, an amplifier to amplify the measurement obtained by the acoustic sensor and/or an analog/digital converter to convert a measured and possibly amplified signal and/or at least an acoustic-waves transmitter. An acoustic-waves transmitter is a means in a measurement sequence that is intended to measure an acoustic wave comprising an acoustic-waves sensor intended to measure an acoustic wave reflected off a target from an acoustic pulse emitted by the acoustic-waves transmitter. Each measurement unit may further comprise at least one sensor able to measure another physical parameter such as, for example, a water salinity sensor to measure the salinity of the water and/or a temperature sensor to measure the temperature of the water.

The various measurement units may comprise different elements.

The measurement device may for example comprise a sonar acoustic waves receive antenna and possibly a transmission antenna.

The invention notably applies to air-launchable sonobuoys comprising a measurement device comprising an acoustic receive antenna.

The description which follows makes reference to air-launchable sonobuoys in the remainder of the text but does apply to any other measurement device as described hereinabove and to any other underwater device able to be immersed and comprising such an acoustic-waves measurement device.

The invention applies for example to any deployable measurement device in which the arms are connected to a support body comprising a reference axis r that is fixed with respect to the support body. The arms are distributed about the axis r and each of the arms is able to be in a furled configuration, when the measurement device is in a stowed configuration, and in a deployed configuration, when the measurement device is in a deployed configuration. One of the ends of each arm moves away from the axis r during the transition from the furled configuration to the deployed configuration. Advantageously, the arms are angularly distributed, preferably but not necessarily evenly, about the axis r.

As an alternative, the measurement device is permanently in the deployed configuration.

The arms may have a fixed length or may be extendible, for example telescopic. The arms then have a stowed configuration in which they are in a furled configuration and have a minimum length, the measurement device then being in the stowed configuration. They make the transition from the stowed configuration to the deployed configuration by the elongating of the arms and by the transition from the furled configuration to the deployed configuration.

The arms may have a fixed length or may be extendible, for example telescopic. The arms then have a stowed configuration in which they are in a furled configuration. They make the transition from the stowed configuration to the deployed configuration by the elongating of the arms and by the transition from the furled configuration to the deployed configuration.

The underwater device may comprise a dunking line connected to the support body, the dunking line extending substantially along the reference axis and substantially vertically at the start of deployment of the arms.

The underwater device comprises, when the measurement device is deployable, deployment means allowing the arms to be moved into their deployed configuration. These deployment means may comprise deployment lines of the guy line type. Each guy line is connected, on the one hand, to one of the arms and, on the other hand, to a dunking line that connects the support body to a float so that under the effect of the immersion of the device, the float and the support body move away from one another causing the dunking line to deploy, and become taut, to extend vertically along the reference axis and to tension the guy lines which then pull on the arms.

As an alternative, floats are fixed for example to the distal ends of the arms, so that when the arms are released, the floats cause the arms to deploy. As an alternative, torsion springs may be installed on the articulations between the arms and the support body. The axis of winding of each torsion spring extends along the axis of the pivot connection connecting the arm to the support body.

The underwater device may be configured in such a way that the arms automatically move from the stowed configuration into the deployed configuration when the underwater device is immersed, or may be configured to deploy the arms on command.

Figure 3:
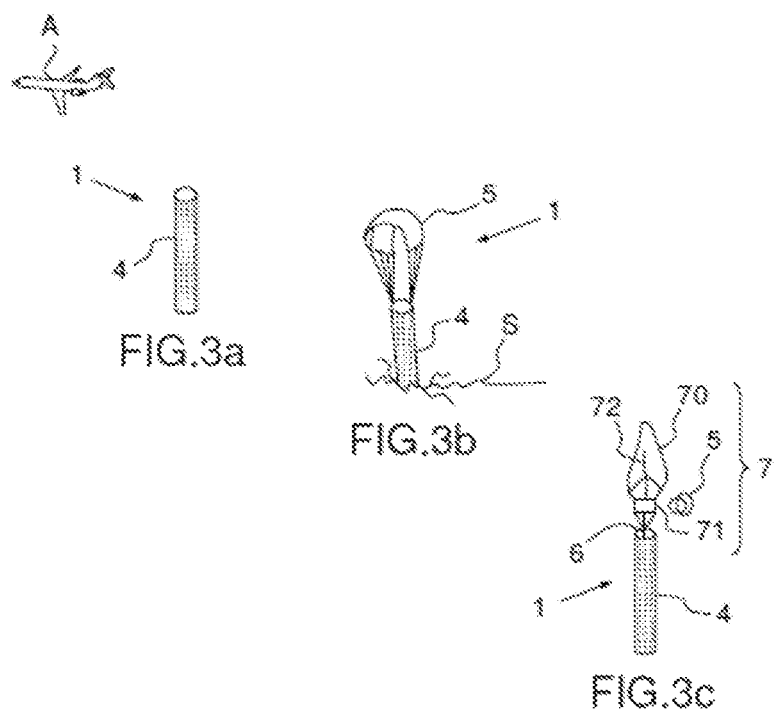
FIG. 3a is a schematic depiction of the launching of an air-launchable buoy from an aircraft.
FIG. 3b is a depiction of the immersion of the air-launchable buoy and FIG. 3c is a schematic depiction of the start of deployment of the buoy following its immersion.

FIG. 3a depicts an aircraft A launching a sonobuoy 1 according to the invention in a marine environment with a view to detecting acoustic waves corresponding to acoustic waves emitted by or reflected (echoed) by potential targets 3. The buoy 1 could as an alternative be launched from a surface vessel, for example from a platform or from an underwater vehicle. In FIG. 3a, the buoy 1 and the measurement device are in an initial stowed configuration in which the elements of the buoy are housed in a casing 4. When the sonobuoy 1 is launched, a parachute 5 belonging to the buoy is automatically deployed to slow its descent as visible in FIG. 3b. Once the buoy is immersed, the internal elements of the buoy leave the casing 4 as depicted in FIG. 3c. The buoy comprises a buoyant body 7 housed initially inside the casing 4 when the buoy is in the stowed configuration, and configured to rise back up to the water surface and remain floating on the water surface when the buoy 1 dips down into the water.

Figure 4:
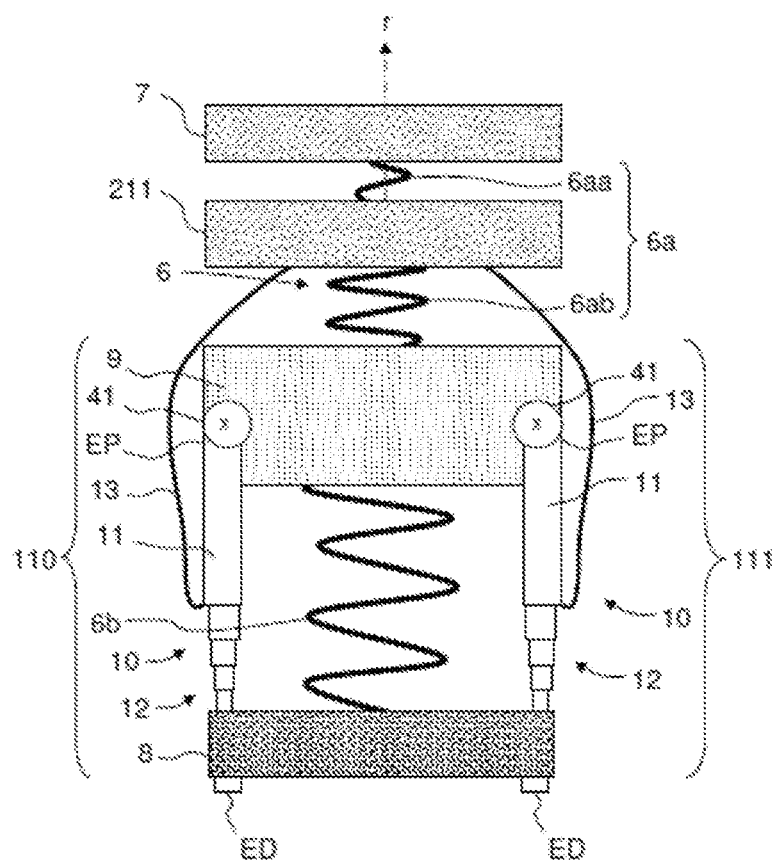
FIG. 4 is a schematic depiction of the internal elements of a deployable buoy in the stowed configuration.
Figure 5:
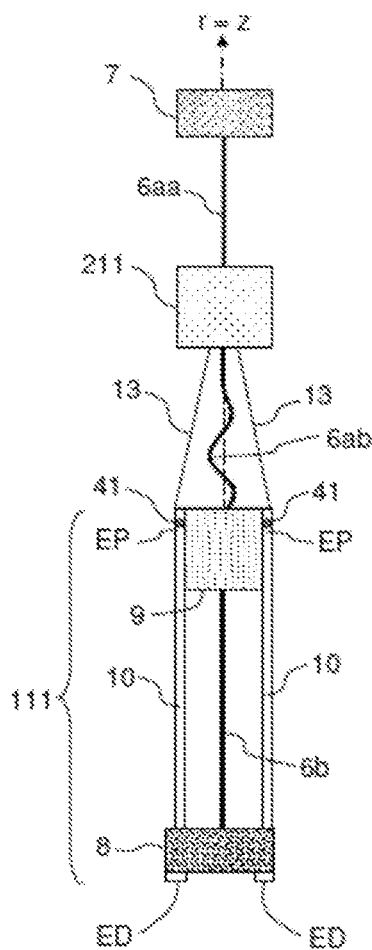
FIG. 5 is a schematic depiction of the buoy of FIG. 4 when the arms have elongated.

FIG. 4 schematically depicts the internal structural elements of the buoy as arranged inside the casing 4 when the buoy is in the stowed configuration. Just as in FIGS. 5 and 6, the measurement units are not depicted in FIG. 4.

The buoy comprises a buoyant body 7 housed initially inside the casing 4 when the buoy is in the stowed configuration, and configured to rise back up to the water surface and float on the surface of the water when the buoy 1 dips down into the water.

The buoy 1 comprises a negative-buoyancy sonar 110. This sonar 110 is connected to the buoyant body 7 by a first portion 6a of a dunking line comprising two sub-portions 6aa, 6ab. The dunking line 6 connects the buoyant body 7 to a negative-buoyancy sonar 110 via an attachment body 211. More specifically, the first portion 6a connects the buoyant body 7 to the sonar 110 via an attachment body 211.

The sonar 110 comprises a receive antenna 111 comprising the support body 9, a set of arms 10 bearing acoustic sensors, not depicted in FIG. 4 in which the whole set of arms has been schematically depicted as two diametrically opposed arms for the sake of greater clarity.

The portions 6a and 6b are initially furled.

In the example of FIG. 4, the receive antenna 111 comprises another body 8 connected to the body 9 by a second portion 6b of the dunking line 6, the body 8 being connected to the buoyant body 7 via the body 9. As an alternative, the body 8 is fixed relative to the body 9. They can be made as one piece.

The receive antenna 111 is deployable. In other words, it is able to transition from a stowed configuration of FIG. 4 to a deployed configuration of FIG. 4 in such a way that each of the arms thus pass from a stowed configuration, in which the arms are in a furled configuration, to a deployed configuration.

The arms 10 are angularly distributed about a reference axis r of the support body 9, namely about an axis r that is fixed with respect to the body 10. The arms 10 are articulated to the support body 9 in such a way as to be able to transition from the from a furled configuration to the deployed configuration by the movement of the arms away from the axis r. More specifically, each arm 10 extends longitudinally from a proximal end EP articulated to the body 9 as far as a distal end ED which moves away from the axis r as the arms 10 deploy.

In the embodiment of the figures, the arms 10 transition from the furled configuration to the deployed configuration by pivoting with respect to the support body 9. The arms 10 are connected to the support body 9 by a pivot connection 41. The axis of each pivot connection 41 is tangential to the reference axis r. In other words, it is tangential to an arc of a circle centered on the reference axis r and perpendicular to the axis r.

The arms 10 are kept in the stowed configuration when the buoy 1 is in the stowed configuration depicted in FIG. 4.

In the particular embodiment of the figures, the arms 10 are telescopic. Each arm 10 comprises a first segment 11 connected to the body 9 and a collection of at least one other segment 12 connected telescopically to the first segment 11 so that the arm 10 can elongate. The arms 10 are able to transition from the stowed configuration of FIG. 4, in which the arms are in the furled configuration, to the deployed configuration of FIG. 6 by the elongation of the arms 10 and the rotation of the arms 10 with respect to the body 9. The arms 10 pass via a configuration referred to as the elongated configuration depicted in FIG. 5, in which they are longer than in FIG. 4 and in which they are still in the furled configuration.

As visible in FIGS. 4 to 7, the buoy 1 comprises one guy line 13 per arm 10. Each guy line 13 is connected, on the one hand, to an attachment body 211 forming attachment between the support body 9 and the buoyant body 7 and, on the other hand, to one of the arms 10, some distance from the articulation between the body 9 and the arm 10.

The guy lines 13 are configured and arranged in such a way as to allow the arms 10 to be made to pivot with respect to the body 9 toward the deployed configuration.

As visible in FIG. 3c, the buoyant body 7 comprises an inflatable bag 70 which emerges from the casing 4 and is inflated by an initially compressed gas housed inside the buoy, when the buoy 1 is dunked into the water, so that the buoyant body 7 exhibits positive buoyancy causing it to rise back up to the water surface S and remain floating on this surface S as the buoy deploys. The buoyant body 7 comprises a transmitter and/or a receiver 72 of radioelectric waves allowing remote and wireless communication between the buoy 1 and a distant receiver and/or transmitter as well as a casing 71 which may for example house electronic equipment.

Whereas the buoyant body 7 rises back up toward the surface, the sonar 110 sinks, as does the casing 4. The distal end ED of each arm 10 is initially mechanically coupled to the body 8 which means that the arms 10 elongate when the body 9 moves away from the buoyant body 7 as far as the elongated configuration of FIG. 5.

The sinking of the body 9 is halted by the portion 6a of the dunking line which becomes taut when the buoyant body 7 starts to float on the water surface. The sinking of the body 8 is halted when the arms are in their elongated configuration. The casing 4 continues to sink and therefore releases the arms 10 from their furled configuration.

Figure 6:
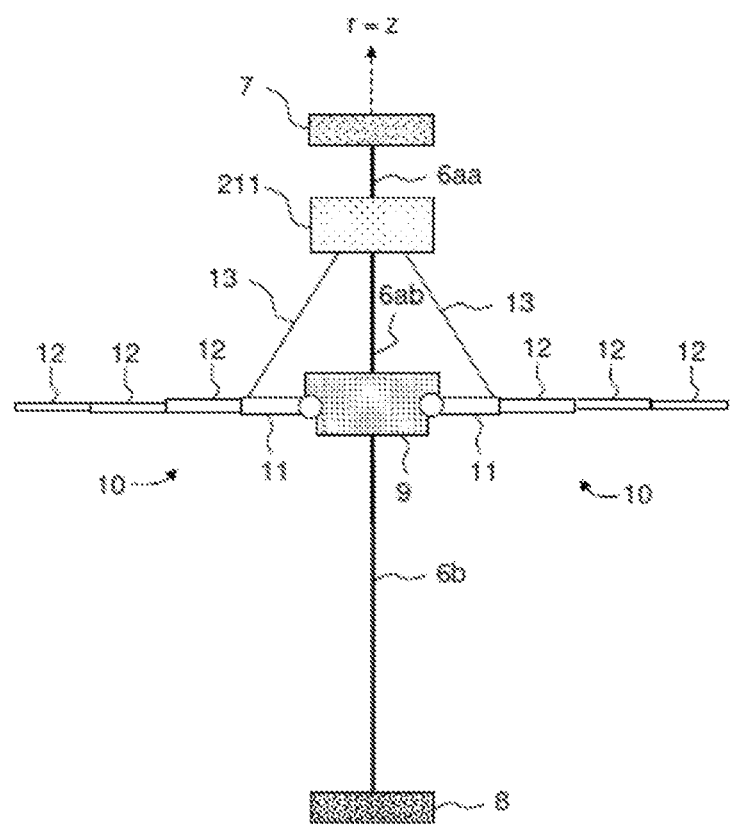
FIG. 6 is a schematic depiction of the buoy of FIG. 4 in a deployed configuration.

The sinking of the body 8 while the body 7 rises up toward the water surface has caused an increase in the vertical distance separating the attachment body 211 from the arms 10, the guy lines 13 have become taut and now pull the arms 10 upward, moving the distal ends ED of the arms 10 away from the body 9 and more particularly away from the reference axis r as far as the deployed configuration of FIG. 6.

The arms 10 therefore extend radially with respect to the reference axis r of the body 9. In other words, the projections of the respective arms in a plane perpendicular to the axis r extend along respective radial axes defined with respect to this axis.

As an alternative, the arms 10 do not extend radially with respect to the reference axis r of the body 9 in the deployed configuration. They may then, for example, be connected to the body 9 by a pivot connection the axis of which is not tangential to the axis r.

In general, the arms are advantageously inclined with respect to the axis r in the deployed configuration.

In the nonlimiting case of the figures, the buoy is configured so that the axis r is substantially vertical (parallel to the axis z) during the transition of the arms from the furled configuration to the deployed configuration. The axis r is the longitudinal axis of the dunking line 6 which is taut along a substantially vertical axis under the effect of the differences in buoyancy between the bodies of the buoy.

In the embodiment shown in the figures, the arms 10 deploy upward. As an alternative, the arms deploy downward.

Figure 7:
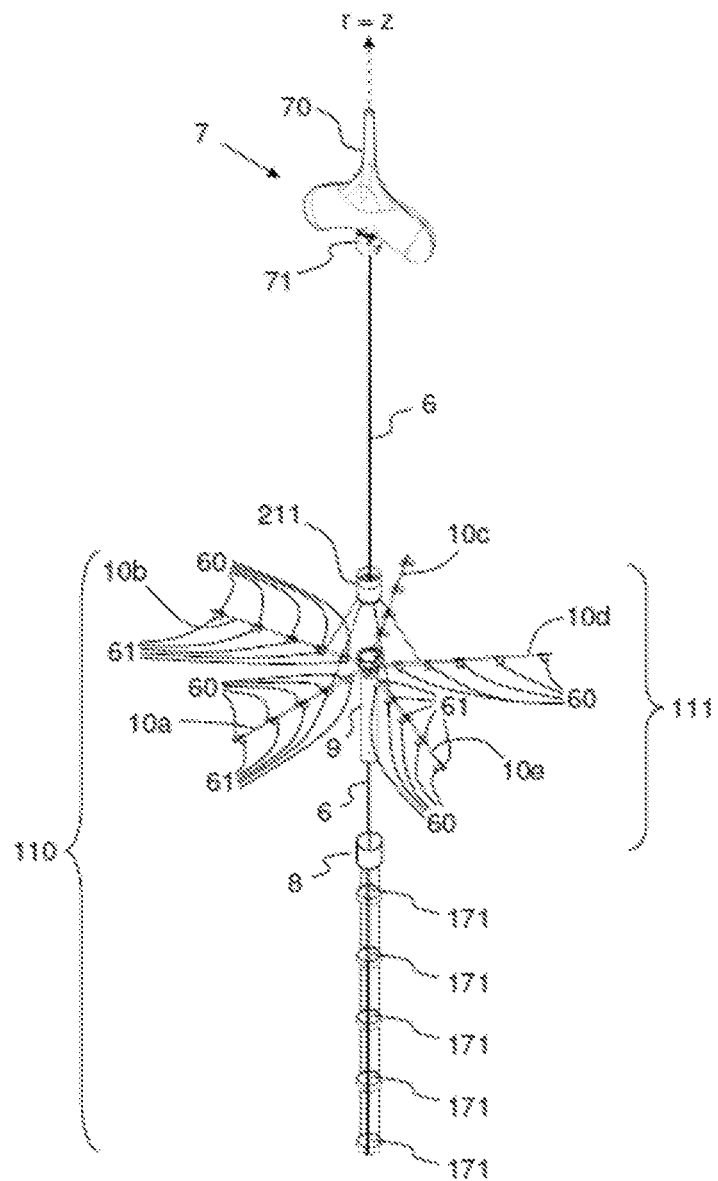
FIG. 7 is a more specific depiction of one example of a deployed air-launchable buoy according to the invention.

The buoy 1 is depicted in its deployed configuration in FIG. 7. The receive antenna is then in the deployed configuration. The arms 10 and the measurement units 60 are depicted more precisely, in the deployed configuration, in FIG. 8.

Figure 8:
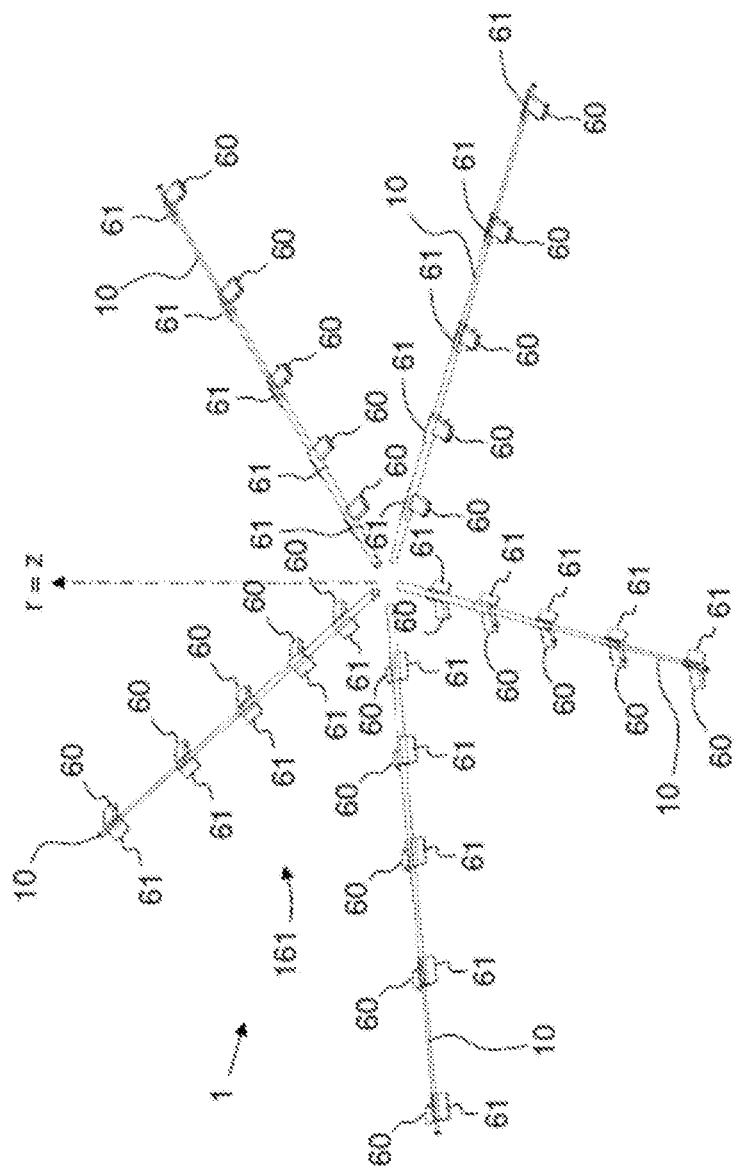
FIG. 8 is a more specific depiction of the deployed arms bearing sensor units.

In the particular embodiment of FIGS. 7 and 8, the arms 10 extend in a plane perpendicular to the axis r of the body in the deployed configuration. As an alternative, the arms are inclined with respect to the plane perpendicular to the axis r in the deployed configuration.

In the embodiment of the figures, the arms exhibit symmetry of revolution about their respective longitudinal axes. In this instance they have a circular cross section. As an alternative, the arms may exhibit a cross section of another shape that remains fixed substantially along their entire length. The diameter of the cross section of the arms may vary along the arms, notably when the arms are telescopic, so as to allow the various sectors of the arms mounted on one another to nest inside one another and allow the various sectors to slide relative to one another. More generally, the arms are configured in such a way as to not generate any torque on the measurement device 111 about the axis r during a vertical translational movement of the measurement device in the deployed configuration.

As visible in FIGS. 7 and 8, the measurement units 60 borne by the arms 10 extend between the arms 10.

Figure 9:
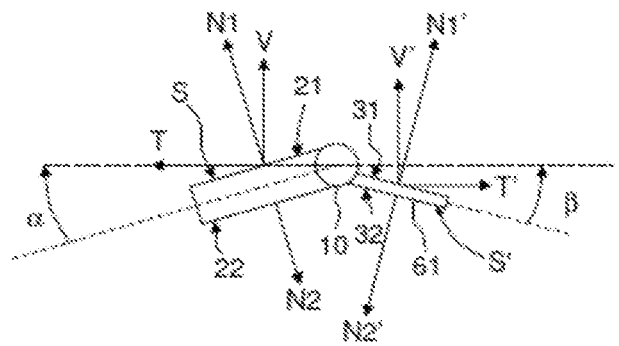
FIG. 9 is a schematic depiction of one of the arms in section on a vertical plane tangential to the reference axis r and passing through one of the sensor units.

FIG. 9 depicts a cross section of FIG. 8 on a vertical plane substantially perpendicular to an arm 10, passing through a measurement unit 60 and tangential relative to the axis r at the measurement unit 60.

As visible in FIG. 9, each measurement unit 60, delimited by a water-contact surface S, generates an individual torque on the receive device 111 about the axis z during a translational movement of the measurement device, in the deployed configuration, along the vertical axis z in both directions (up and down). The individual torques are directed in the same direction about the axis z so that the set of measurement units 60 generates a torque, about the axis z, in this same direction. What is meant by a water-contact surface is a surface intended to be in direct physical contact with the water when the measurement device is immersed.

Specifically, as indicated schematically in FIG. 9, under the effect of the flow of water over the contact surface S of the measurement unit 60 during an upward vertical translational movement, each measurement unit experiences a force comprising a vertical component V and a horizontal component comprising a tangential component T. This tangential component T generates a torque, referred to as an individual torque, on the measurement device 111 about the axis z.

In the nonlimiting example of the figures, the measurement units 60 each have a substantially parallelepipedal shape extending between the arms and being inclined, in the deployed configuration, with respect to the axis r which is substantially the vertical axis z in the deployed configuration. This shape of the measurement units is of course nonlimiting. The two largest faces of the measurement unit 60 are a first face 21 and a second face 22, these being water-contact surfaces. To a first approximation, the force experienced by the measurement unit during a translational movement of the deployed measurement device 111 in the upward direction is the force experienced by the first surface 21 and that experienced by the face 22 during a downward vertical movement. These faces 21 and 22 are inclined with respect to the reference axis r substantially parallel to the axis z and with respect to a substantially tangential horizontal straight line, the tangential direction being defined with respect to the axis r. This is also the case with their respective normals N1, N2.

In the nonlimiting example of the figures, the horizontal component H of the force experienced by the measurement unit during each (upward or downward) vertical translational movement is the tangential component T.

The tangential components T of the forces experienced by the various measurement units 60 are, in the nonlimiting example of the figures, oriented in the one same direction because the measurement units 60 exhibit, in the deployed configuration, the same inclination with respect to the axis z and with respect to respective tangential axes at the respective measurement units.

According to the invention, the measurement device 111 comprises compensation means 161 configured and arranged in such a way as to limit or prevent the rotation of the measurement device 111, in the deployed configuration, about the axis z during an upward and/or downward vertical translational movement. The compensation means 161 oppose the rotational movement of the measurement device that the measurement units tend to bring about during this vertical movement. In other words, the compensation means 161 are configured and arranged to generate, during a vertical movement of the measurement device 111 in the deployed configuration, a torque on the measurement device 111 about the axis z in the opposite direction to the torque generated by the measurement units 60 during the same vertical movement and of an intensity such that the total torque experienced by the measurement device about the axis z during the vertical movement of the deployed measurement device has an intensity lower than that of the torque on the measurement device about the axis z generated by the measurement units 60. That makes it possible to limit the rotation of the measurement device about the axis z. For this purpose, the torque generated by the compensation means about the axis z has an intensity lower than the intensity of the torque generated by the measurement units, so the measurement device therefore still rotates about the axis z, but at a lower speed. As an alternative, the torque generated by the compensation means about the axis z has an intensity substantially equal to the intensity of the torque generated by the measurement units and so the measurement device is then substantially immobile in terms of rotation about the axis z. As an alternative, the torque generated by the compensation means about the axis z has an intensity less than twice the intensity of the torque generated by the measurement units, and so the measurement device then rotates in the opposite direction, by comparison with a device not fitted with compensation means, but at a lower speed.

The invention makes it possible to limit or reduce the rotation of the measurement device which is brought about by the vertical movement and therefore to limit the aforementioned problems connected with the measurement device rotating about the axis of rotation. Furthermore, this solution does not require any rotational mobility of the measurement units 60 about the longitudinal axis of the arms, making the device able to maintain a certain reliability connected with limiting the number of moving parts.

Advantageously, the compensation means are configured and arranged in such a way that the torque about the axis z generated by the compensation means 161 is substantially the opposite of the torque about the axis z generated by the set of measurement units 60 during the up and/or down vertical movement. That makes it possible to avoid the measurement device 111 rotating about the axis r under the effect of the vertical movement in the direction or directions concerned.

As visible in FIG. 9, the compensation means 161 comprise a set of at least one compensation unit 61 delimited by a surface, referred to as compensation surface S', intended to be in direct physical contact with the water when the measurement device is immersed. The compensation units 61 are configured and arranged in such a way as to generate a torque, referred to as compensation torque, on the measurement device about the axis z in the opposite direction to the torque generated on the measurement device about the axis z by the measurement units 60 during an up and/or down vertical movement of the measurement device in the deployed configuration so as to limit the rotational movement of the measurement device 111 about the axis z. The torque generated by a compensation unit during a vertical translational movement is a result of the flow of water over the surface of the compensation unit during this movement.

In other words, when the measurement device 111 is in the deployed configuration, each compensation unit experiences, under the effect of the flow of water over its surface during a translational movement of the measurement device in the deployed configuration along the axis z, a force that comprises a vertical component V' (during an upward vertical movement) and a horizontal component comprising a tangential component T' tangential to the axis z and directed in the opposite direction to the tangential component T. The same occurs during a vertical translation of the deployed measurement device along the axis z.

The vertical component V' is in the same direction as the vertical component V.

In the nonlimiting example of the figures, as visible more specifically in FIG. 9, each compensation unit 61 essentially has the form of a rectangular parallelepiped and comprises two larger faces 31 and 32 substantially forming the compensation surface S'. These faces 31 and 32 are inclined, in the deployed configuration, with respect to the reference axis r substantially parallel to the axis z and with respect to a tangential axis defined with respect to the axis r. This is also the case with their respective normals N1', N2'. The tangential axis defined with respect to the axis r is an axis tangential to a circle centered on the reference axis r and perpendicular to the reference axis r, at the compensation unit or at the face in question. In other words, the tangency of the axis to the circle is at the site of the compensation unit or of the face in question. The circle is centered on the reference axis and perpendicular to the reference axis.

To a first approximation, the component T' of the force experienced by the compensation unit during an upward vertical movement of the deployed compensation device is the tangential component of the force experienced by the surface 31 situated facing the flow of water during this movement. To a first approximation, the component T of the force experienced by the compensation unit during a downward vertical movement of the deployed compensation device is the tangential component of the force experienced by the surface 32 situated facing the flow of water during this movement.

In general, each measurement unit advantageously comprises a first water-contact surface having a mean normal which, in the deployed configuration, is inclined with respect to the reference axis and with respect to a first tangential axis defined with respect to the reference axis, so as to generate an individual torque on the measurement device about the reference axis r during a translational movement of the measurement device along the reference axis in one direction. The mean normal to a surface is the sum of the elementary normals to the elementary surfaces of the surface. The first tangential axis defined with respect to the axis r is an axis tangential to a circle, centered on the reference axis r and perpendicular to the reference axis r, at the measurement unit in question or at the surface in question. It is represented here by the axis T.

When the up thrust of the measurement unit is negligible, the first water-contact surface is substantially that part of the surface of the measurement unit that is oriented in the direction of the vertical translational movement of the measurement device.

In the nonlimiting example of FIG. 9, the surface oriented in the direction of the vertical translational movement of the measurement device is substantially the surface 21 during an upward movement and 22 during a downward movement.

Each compensation unit advantageously comprises a second water-contact surface having a mean normal which, in the deployed configuration, is inclined with respect to the reference axis r and with respect to a second tangential axis defined with respect to the reference axis r so as to generate an individual compensation torque on the measurement device about the reference axis r during the translational movement of the measurement device along the reference axis in the same direction. The second tangential axis defined with respect to the axis r is an axis tangential to a circle, centered on the reference axis r and perpendicular to the reference axis r, at the site of the compensation unit or of the surface in question. It is represented here by the axis T'.

When the up thrust of the compensation unit is negligible, the water-contact surface is substantially the surface oriented in the direction of the vertical translational movement of the measurement device.

In the nonlimiting example of FIG. 9, the surface oriented in the direction of the vertical translational movement of the compensation unit is substantially the surface 31 during an upward movement and the surface 32 during a downward movement.

That all applies to various forms of measurement unit and compensation unit. These units may take the overall shape of a plate having large rectangular surfaces or surfaces of any other shape, such as elliptical for example.

The surface in direct contact with the water may be planar or nonplanar. It may, for example, exhibit ribs.

The measurement or compensation unit may have one or more notches.

These units may have a fixed or variable thickness. The thickness may be considered in the direction of an axis tangential to an axis of an arm. This thickness may vary according to a radial axis defined with respect to the axis of the arm.

At least one measurement unit and/or one compensation unit may be of the "airfoil" type. Advantageously, a straight line passing through a leading edge and a trailing edge of the compensation unit (or of the measurement unit) has a normal which, in the deployed configuration, is inclined with respect to the reference axis r and with respect to an axis tangential to the reference axis r so as to generate the associated torque. The tangential axis defined with respect to the axis r is an axis tangential to a circle, centered on the reference axis r and perpendicular to the reference axis r, at the unit in question or at the normal in question.

Advantageously, although not necessarily, as visible in FIG. 9, the compensation units are configured and arranged in such a way that the horizontal component H experienced by each measurement unit 60 and the one H' experienced by each compensation unit during the up and/or down vertical movement is substantially tangential, or in other words exhibits only a tangential component T or T'. This configuration makes it possible to avoid a translational movement of the device along the radial axis (defined with respect to the axis z).

The mean normal to the first water-contact surface of each measurement unit is advantageously comprised, in the deployed configuration, in a plane containing an axis parallel to the reference axis r and the first tangential axis defined with respect to the reference axis r. The mean normal to the second water-contact surface of each compensation unit is advantageously comprised, in the deployed configuration, in a plane containing an axis parallel to the reference axis r and the second tangential axis defined with respect to the reference axis r.

The measurement units 60 are oriented in such a way that each compensation unit generates an individual torque on the measurement device 111 in the same direction about the axis z during a translational movement of the measurement device in one direction along the axis z. Furthermore, the compensation units 61 are oriented in such a way that each compensation unit 61 generates an individual torque, referred to as individual compensation torque, on the measurement device 111 about the axis z, in the same direction, that is the opposite to that of the individual torques generated by the measurement units during a translational movement of the measurement device 111 in the same direction along the axis z.

The measurement units 60 and the compensation units 61 are borne by the arms 10 so as to be driven by the arms 10 during the transition of the arms during their transition from the furled configuration to the stowed configuration.

The measurement units 60 and the compensation units 61 extend between the arms 10. More specifically, each one of them and each one of the compensation surfaces extends between two adjacent arms, namely over an angular sector formed about the axis r and separating two adjacent arms.

In the particular embodiment of the figures as visible in FIG. 8, each measurement unit 60 is fixed to an arm 10 and each compensation unit 61 is fixed to an arm 10. That makes it possible to ensure better reliability of the measurement device than if these units were mounted with the ability to move on the arms, for example with the ability to pivot about their respective longitudinal axes.

In the embodiment of the figures, several measurement units 60 and several compensation units 61 are mounted on each of the arms. As an alternative, at least one compensation unit and/or at least one measurement unit is mounted on each of the arms. For example, the compensation units may be mounted on different arms from the measurement units. In the particular embodiment of the figures, each arm 10 bears the same number of measurement units 60 as of compensation units, but some of them are not visible in FIG. 8.

The compensation and measurement units each form a protrusion on one of the arms. That prevents the compensation and measurement units from nesting in one another when mounted on a telescopic arm of which the segments are able to fit inside one another. Thus, the compensation and measurement units that are adjacent along one and the same arm move further apart from one another as the arm elongates. Thus, the various measurement units mounted on the one same arm are distant from one another in the deployed configuration and these measurement units and/or these compensation units may rest against one another in the deployed configuration. The fact that the measurement units move away from one another makes it possible to obtain an antenna of a larger size and makes it easier to pinpoint the position of targets detected by the antenna.

In the embodiment of the figures, each measurement unit 60 mounted on an arm forms a protrusion on one of the arms 10, the protrusion moves away from the arm 10 in the one same first direction of rotation about the axis z when the measurement device is deployed. In other words, each of the measurement units 60 mounted on the one same arm forms a protrusion on the arm on the one same side of a plane radial to the axis z containing the radial axis of the arm. Each of the compensation units 61 mounted on the one same arm 10 forms a protrusion on the arm on the other side of the plane radial to the axis z containing the radial axis of the arm, with respect to the measurement units 60 that are mounted on the same arm 10. Furthermore, each of the compensation units 61 forms a protrusion that moves away from the arm 10 on which it is mounted in the one same second direction of rotation about the axis z that is the opposite to the first direction.

In the particular embodiment of the figures, each measurement unit 60 is associated with a compensation unit 61 fixed to the same arm 10, preferably to the same segment 11 or 12 of the arm 10 as the measurement unit 60 facing the measurement unit 60 on the other side of a plane radial to the axis z containing the radial axis of the arm 10. The various measurement units 60 are associated with respective different compensation units 61. Each compensation unit 61 is arranged and configured in such a way as to exert an individual compensation torque with a modulus lower than twice the individual torque exerted by the measurement unit 60 associated with it. That makes it possible, in the case of telescopic arms, to avoid the generation of twist about the various segments of the telescopic arms about the longitudinal axis of the arm. It also makes it possible to limit the generation of torque, inside the arm or arm segment in question, about a tangential axis of rotation and liable to cause the arms to bend. These two types of torque introduce stress into the arms that could cause the arms to deform in ways liable to impair the performance of the receive antenna 111, as the sensors ought, for preference, to be coplanar or at least to exhibit predetermined arrangements relative to one another in the deployed configuration. The configuration proposed also makes it possible to equalize the axial component of the drag at arm level and limit the risks of the measurement device becoming destabilized during the vertical translational movement of the measurement device.

Advantageously, the compensation unit 61 and the measurement unit 60 which are associated with one another are symmetric with respect to the one same tangential plane that is vertical when the measurement device 111 is deployed.

Furthermore, in the particular embodiment of the figures, the compensation unit associated with a measurement unit is of one piece with this measurement unit. That allows the assembled set to be mounted very quickly. As an alternative, these two units belong to two different components.

Advantageously, the unit comprising the measurement unit and the compensation unit which are associated with one another incorporates means for mounting the measurement and compensation unit on the arm.

As an alternative, the measurement and compensation units associated with one another are offset along the arm or along the one same segment of the arm. Nevertheless, this solution is not as compact and it becomes more difficult to regulate the surfaces of the compensation units. Furthermore, this solution increases the risks of the arms deforming and of the measurement device becoming destabilized.

As an alternative, the number of compensation units is different from the number of measurement units. It is even possible to envision a single compensation unit.

If the volume available is large enough, it is possible to provide a single compensation unit configured and arranged to generate a torque in the opposite direction to the torque generated by the set of measurement units in the event of translational movement of the measurement device upward and/or downward.

In the particular embodiment of the figures, the measurement units and the compensation units each have the form of a plate exhibiting essentially the shape of a rectangular parallelepiped comprising two larger faces connected by four lateral faces of which one lateral face is against the arm along the entire length of that lateral face. This form is entirely nonlimiting, any other form being conceivable. The faces of the compensation unit are not necessarily planar nor in parallel pairs. The measurement and compensation units are advantageously configured so that they do not deform when immersed, for example under the effect of the vertical movement of the measurement device.

Advantageously, the measurement units 60 and the compensation units 61 are mounted on the arms in such a way as to be housed inside the casing 4 when the arms are in the stowed configuration. This constraint therefore excludes the measurement and compensation units being arranged in such a way as to lie in the horizontal plane of the arms in the deployed configuration.

Figure 10:
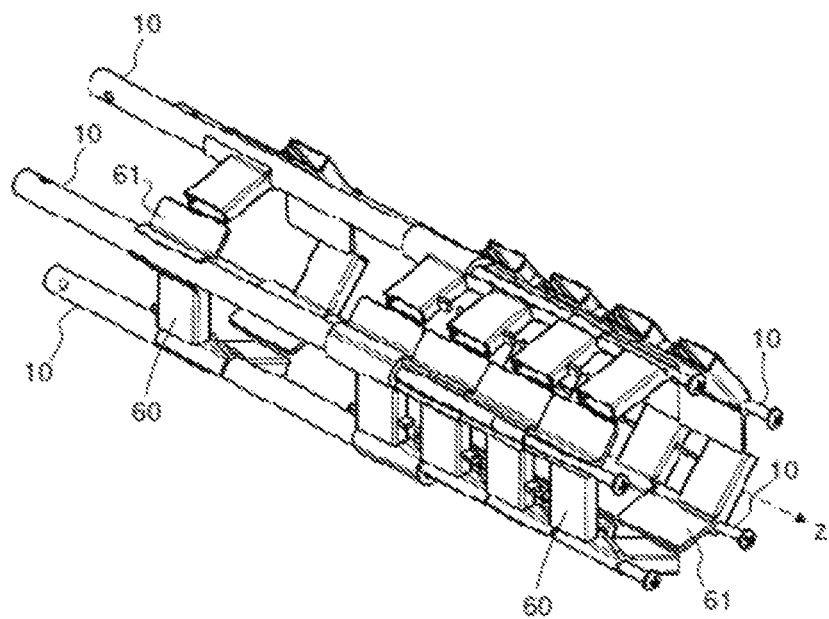
FIG. 10 is a schematic depiction of the arms in a furled configuration.

Thus, advantageously, the measurement units 60 and the compensation units 61 are for example mounted on the arms in such a way as to be inscribed inside a cylinder of axis r delimited by the arms 10 when the arms are in the furled configuration as depicted in FIGS. 10 (without the casing) and 11 (with the casing).

Advantageously, the measurement units 60 and the compensation units 61 are mounted on the arms 10 in such a way as to be housed, perpendicular to the axis r, in an annulus of axis r delimited by the casing 4 and the body 9 in the stowed configuration.

In the nonlimiting embodiment of the figures, the arms 10 deploy upward and extend in one and the same substantially horizontal plane in the deployed configuration. The compensation units 61 and measurement units 60 therefore extend below the plane of the arms 10, along the axis z, in the deployed configuration.

As an alternative, the arms deploy downward and extend in the one same substantially horizontal plane in the deployed configuration. The compensation and measurement units then extend above the plane of the arms, along the axis r.

Advantageously, the various measurement units 60 are configured and arranged in such a way as to be subjected to the one same tangential component T during a vertical translational movement of the deployed measurement device 111 in one direction and/or in the opposite direction. That is advantageously also the case in respect of the various compensation units and the tangential component T'. That allows for a certain ease of embodiment of the measurement device 111.

To that end, in the nonlimiting embodiment of the figures in which the arms 10 are arranged in a substantially horizontal plane in the deployed configuration, the measurement units 60 have the one same external envelope, namely the one same first contact surface 21 and the one same second contact surface 22. Moreover, as visible in FIG. 9, the measurement units 60 are arranged in such a way as to form the one same angle $\alpha$ oriented about the axis of the arm 10 on which they are respectively mounted with respect to the horizontal plane H in the deployed configuration. That makes it possible to ensure coplanar positioning of the set of measurement units 60 and linear positioning of the measurement units mounted on the one same arm. The same is true of the compensation units 61 which have the one same external envelope, namely the one same first compensation surface 31 and the one same second compensation surface 32. Furthermore, the compensation units 61 are arranged in such a way as to form the one same radial angle $\beta$ oriented about the axis of the arm 10 on which they are respectively mounted with respect to the horizontal plane in the deployed configuration. Furthermore, because the corresponding compensation and measurement units are positioned facing one another, in order to generate torques of the same intensity about the axis r, their first compensation and contact surfaces have the same surface area, their second compensation and contact surfaces have the same surface area and they form, about the axis r, angles $\alpha$ and $\beta$ that are equal.

It should be noted that these features are not limiting; the dimensions, shapes and arrangements of the compensation units on the arms may differ from those described hereinabove while at the same time generating the one same individual torque that is the opposite of the individual torque generated by the associated measurement unit.

Figure 11:
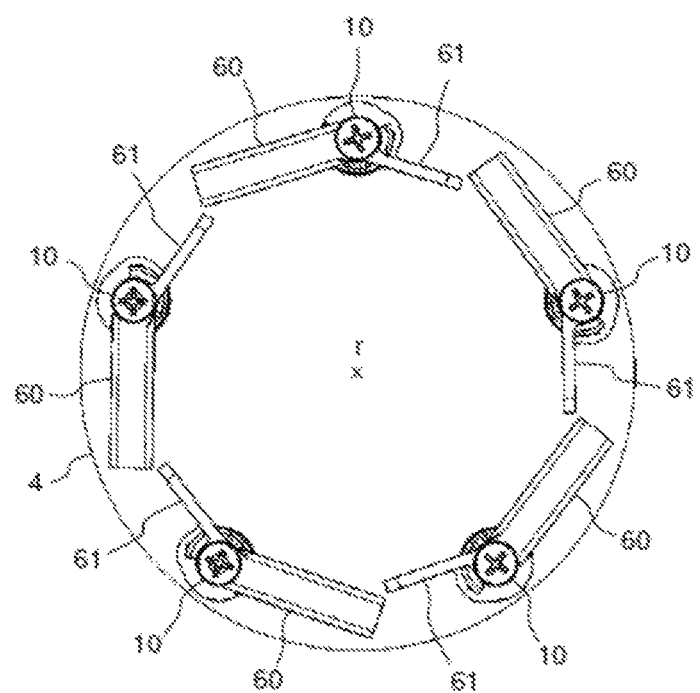
FIG. 11 is a schematic depiction in transverse cross section of the arms initially in the furled configuration and housed inside the casing, the body 9 not being depicted for the sake of greater clarity.

In the embodiment of the figures, the dimension of each compensation unit 61 along the axis of the arm 10 on which it is mounted is greater than the dimension of the measurement unit associated with it, whereas its tangential dimension is greater than that of the measurement unit in the stowed configuration of FIG. 11. In other words, the compensation unit is dimensioned so as to occupy a smaller subtended sector than the associated measurement unit about the axis r, particularly in the stowed configuration. Specifically, as visible in FIG. 11, each measurement unit 60 does not leave enough space between the arm 10 on which it is mounted and the adjacent arm 10 for the compensation unit to be able to exhibit as large a tangential dimension as the measurement unit.

As an alternative, the measurement device comprises at least one measurement unit and/or one compensation unit which is fixed to a cable borne by adjacent arms and configured and arranged in such a way as to be under tension in the deployed configuration.

At least one compensation unit may comprise at least one means of the measurement sequence other than an acoustic sensor. At least one compensation unit may comprise an amplifier and/or an analog/digital converter and/or an acoustic-waves emitter, namely a means configured to emit acoustic waves. At least one compensation unit may comprise at least one sensor able to measure another physical parameter such as, for example, a water salinity sensor to measure the salinity of the water and/or a temperature sensor to measure the temperature of the water. As an alternative, the compensation unit does not have means forming part of a measurement sequence.

In the embodiment of the figures, the measurement device 111 also comprises acoustic transmitters 171 attached to the dunking line 6 as visible in FIG. 7. The receive antenna 111 is interposed between the transmitters 171 and the buoyant body 7 on the line 6. These acoustic transmitters 171 are initially housed inside the casing 4.

The main cause for our system rotating during the vertical movements is the fact that the measurement units are inclined. This inclination is caused for example by the need to incorporate the measurement units into a limited volume when the measurement device is in a stowed configuration. The solution is therefore to employ similar surfaces that make it possible to create a counter-torque in order to limit or reduce the torque on the measurement device about the axis r.

The proposed solution makes it possible to ensure good stability of the measurement device even in the presence of swell or changes in depth. Specifically, this solution makes it possible to limit, if not to say cancel, the rotational movements of the measurement device by the measurement units during a vertical movement of the measurement device that may for example be caused by the swell or by a demanded change in depth. The compensation surfaces are, by nature, small in size of the order of that of the compensation units. Therefore, they exhibit a small horizontal surface area leading to a small increase in drag and therefore not disturbing changes in depth, notably the speed during changes in depth.

The solution proposed is easy to implement. It exhibits for example a limited cost and occupies a very small amount of volume which is at a premium in the field of air-launchable buoys which are single-use items.

The invention claimed is:

1. A measurement device intended to be immersed in water, comprising a set of arms and a reference axis, the measurement device being able to be in a deployed configuration wherein the arms extend radially about the reference axis, the measurement device comprising a set of measurement units borne by arms of the set of arms and each comprising an acoustic-waves sensor, the set of measurement units being configured and arranged in such a way as to generate a torque on the measurement device about the reference axis upon a vertical translational movement of the measurement device in the deployed configuration, each measurement unit of the measurement set comprising a first water-contact surface intended to be in direct physical contact with the water and oriented, in the deployed configuration, in such a way that it experiences, under the effect of the flow of water over the first water-contact surface during the vertical translational movement, a first force comprising a vertical component and a horizontal component comprising a tangential component generating an individual torque on the measurement device about the reference axis, the individual torques generated by the measurement units of the measurement set being oriented in the direction of the torque, the measurement device comprising compensation means configured and arranged in such a way as to generate another torque on the measurement device about the reference axis during the vertical translational movement, the other torque being directed in the opposite direction to the torque and having an intensity less than twice that of the torque, the compensation means comprising a set of at least one compensation unit comprising a second water-contact surface intended to be in direct physical contact with the water and oriented, in the deployed configuration, in such a way that it experiences, under the effect of the flow of water over the second water-contact surface during the vertical translational movement, a second force comprising a vertical component and a horizontal component comprising a tangential component generating an individual compensation torque on the measurement device about the reference axis, the individual compensation torque being oriented in the opposite direction to the torque.

2. The measuring device as claimed in claim 1, wherein the other torque has an intensity substantially equal to the intensity of the torque.

3. The measuring device as claimed in claim 1, wherein the compensation unit is arranged and configured in such a way that the force experienced by the compensation unit has a horizontal component comprising only a tangential component.

4. The measurement device as claimed in claim 1, wherein the set of at least one compensation unit and the set of measurement units is fixed to the set of arms.

5. The measurement device as claimed in claim 1, wherein one compensation unit is associated with each measurement unit, the compensation unit associated with a measurement unit being fixed to the one same arm as the measurement unit and being configured and arranged in such a way as to generate, during the vertical translational movement, an individual torque on the measurement device substantially in the opposite direction to an individual torque generated by the measurement unit during the vertical translational movement.

6. The measurement device as claimed in claim 5, wherein the individual torque generated by the compensation unit is substantially the opposite of the individual torque generated by the measurement unit.

7. The measuring device as claimed in claim 5, wherein the arms are telescopic and each comprise several segments able to slide relative to one another, the compensation unit being fixed to the one same segment as the associated measurement unit.

8. The measurement device as claimed in claim 5, wherein the measurement unit is one piece with the associated compensation unit.

9. The measurement device as claimed in claim 1, wherein the compensation unit occupies, about the reference axis r, an angular sector subtending a smaller angle than an angular sector occupied by the measurement device with which it is associated.

10. The measurement device as claimed in claim 1, wherein the set of measurement units comprises a subset of measurement units which are mounted on the one same arm, the measurement units of the subset being positioned on the one same side of the plane radial to the reference axis containing the axis of the arm.

11. The measurement device as claimed in claim 10, wherein each compensation unit mounted on the arm is positioned on the other side of the radial plane.

12. The measurement device as claimed in claim 1, wherein the second water-contact surface has a mean normal that is inclined, in the deployed configuration, with respect to the reference axis and with respect to an axis tangential to the reference axis, so as to generate the individual compensation torque on the measurement device about the reference axis.

13. The measurement device as claimed in claim 12, wherein the second water-contact surface is oriented in the direction of the vertical translational movement.

14. The measurement device as claimed in claim 1, wherein the compensation unit has the form of a parallelepipedal plate.

15. The measurement device as claimed in claim 1, wherein a straight line passing through a leading edge and a trailing edge of the compensation unit has a normal that is inclined, in the deployed configuration, with respect with respect to the reference axis and with respect to a tangential axis, defined with respect to the reference axis, so as to generate the individual torque on the measurement device about the reference axis.

16. The measurement device as claimed in claim 1, wherein the first water-contact surface has a mean normal that is inclined, in the deployed configuration, with respect to the reference axis and with respect to a tangential axis, defined with respect to the reference axis, so as to generate the individual torque on the measurement device about the reference axis.

17. The measurement device as claimed in claim 1, wherein at least one compensation unit incorporates a measurement element other than an acoustic sensor.

18. The measurement device as claimed in claim 1, wherein the compensation unit has no acoustic sensor.

19. The measurement device as claimed in claim 1, wherein the measurement device is able to be in a stowed configuration wherein the arms are inscribed inside a cylinder the axis of which is the reference axis, the measurement units and the compensation means being configured and arranged in such a way as to be housed inside said cylinder when the measurement device is in the stowed configuration.

20. The measurement device as claimed in claim 1, wherein the arms extend in a plane substantially perpendicular to the reference axis in the deployed configuration.

21. A sonobuoy comprising a measurement device as claimed in claim 1.

22. The sonobuoy as claimed in claim 21, comprising a buoyant body and a dunking line to which the buoyant body and the arm are connected, the buoy being configured in such a way that the buoyant body floats on the water surface and the dunking line extends longitudinally along a vertical axis that substantially coincides with the reference axis when the measurement device is in the deployed configuration.

* * * * *

UNITED STATES PATENT AND TRADEMARK OFFICE
CERTIFICATE OF CORRECTION

PATENT NO. : 11,550,071 B2
APPLICATION NO. : 16/755878
DATED : January 10, 2023
INVENTOR(S) : Florian Prevel et al.

Page 1 of 1

It is certified that error appears in the above-identified patent and that said Letters Patent is hereby corrected as shown below:

In the Claims

In Claim 15, Column 19, Line 24, "configuration, with respect with respect to the reference" should be -- configuration, with respect to the reference --.

Signed and Sealed this
Twenty-seventh Day of August, 2024

Katherine Kelly Vidal
*Director of the United States Patent and Trademark Office*